Figure 1:
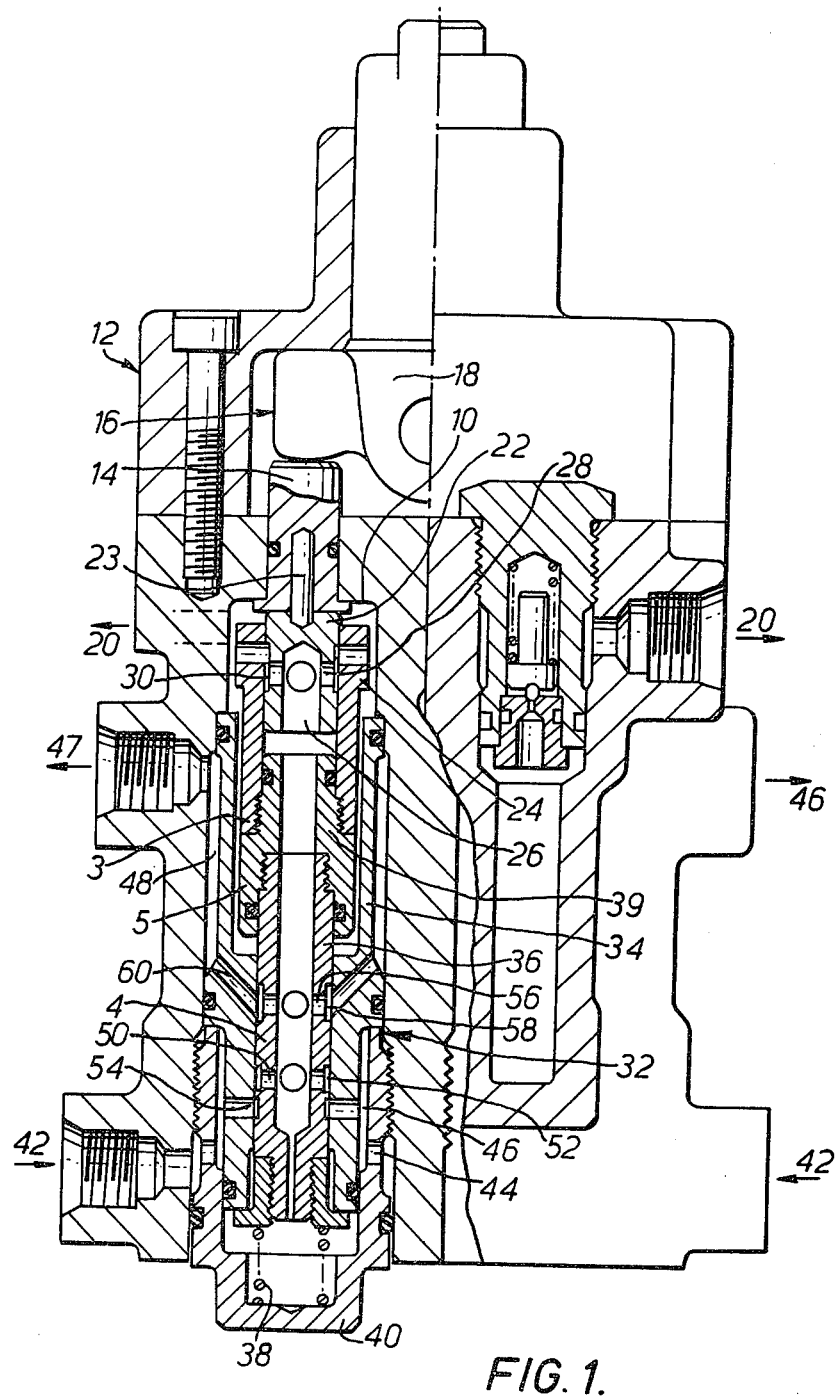

United States Patent [19]

Hawker

[11] 4,260,197
[45] Apr. 7, 1981

[54] SPOOL TYPE BRAKE VALVES

[75] Inventor: Michael J. Hawker, Lincoln, England

[73] Assignee: Clayton Dewandre Company Limited, England

[21] Appl. No.: 904,867

[22] Filed: May 11, 1978

[30] Foreign Application Priority Data

May 20, 1977 [GB] United Kingdom ............... 21456/77

[51] Int. Cl.³ ............................................... B60T 15/08
[52] U.S. Cl. ......................................... 303/52; 303/54
[58] Field of Search ............ 60/548; 137/596, 596.13, 137/627, 5; 303/9, 10, 50, 52, 56, 54

[56] References Cited

U.S. PATENT DOCUMENTS

| 1,545,490 | 7/1925 | George | 303/50 X |
|---|---|---|---|
| 1,599,619 | 9/1926 | Mitton | 303/54 |
| 1,874,297 | 8/1932 | Ives | 303/54 |
| 2,355,692 | 8/1944 | Allen | 303/52 X |
| 2,606,739 | 8/1952 | Gardner | 303/50 X |
| 3,053,052 | 9/1962 | Garrison et al. | 60/548 |
| 3,240,019 | 3/1966 | Gordon et al. | 60/548 |
| 3,605,814 | 9/1971 | Gordon | 303/10 X |
| 3,684,330 | 8/1972 | Kito | 303/10 X |
| 3,695,731 | 10/1972 | England et al. | 303/9 X |
| 3,881,512 | 5/1975 | Wilke | 137/596.13 |
| 3,977,732 | 8/1976 | Grosseau | 303/52 X |
| 4,078,581 | 3/1978 | Kervagoret | 137/596.13 X |

*Primary Examiner*—Duane A. Reger
*Attorney, Agent, or Firm*—Burns, Doane, Swecker & Mathis

[57] ABSTRACT

Spool type brake valve for use in motor vehicle braking systems. The valve has an exhaust valve assembly and an inlet valve assembly. The former having a spool displaceable by a brake pedal or the like to disconnect the brake-port from an exhaust port and the latter having a spool movable within a sleeve upon subsequent displacement of the exhaust valve to supply pressure fluid to the brake port.

4 Claims, 2 Drawing Figures

SPOOL TYPE BRAKE VALVES

This invention relates to full power hydraulic braking systems for motor vehicles, that is, systems incorporating pumping, accumulator and unloader means operable to maintain a constant pressure within the system, and a brake valve for controlling the application and release of fluid pressure to and from the brake units.

An object of the present invention is to provide an improved spool type brake valve, especially one for use in such systems, which brake valve by avoiding the necessity of accurate longitudinal positioning of the inlet valve relative to the exhaust valve, simplifies manufacture with corresponding economy in production whilst at the same time giving finer valve overlap control and other advantages more fully defined hereafter.

According to the invention the improved brake valve comprises an exhaust valve assembly consisting of an exhaust spool displaceable within an exhaust body or sleeve by a thrust from a brake pedal or the equivalent to close off a brake-connected port from an exhaust or return port, and an inlet valve assembly consisting of an inlet spool movable within a fixed inlet body or sleeve by a subsequent displacement of the exhaust valve assembly to meter pressure fluid from a supply port to said brake-connected port.

In our prior U.S. Pat. No. 1,319,245 we have described a dual brake valve for a split braking system and which comprised two valve assemblies actuated through a balancing beam and a safety valve associated with each valve assembly. The present invention has particular but not exclusive application to such a dual brake valve.

Two embodiments of the invention will now be described by way of example with reference to the accompanying drawings of which FIGS. 1 and 2 each show a cross-section of one embodiment of the invention for use in a hydraulic brake valve.

Extending into the upper end of a valve chamber 10 formed in the common valve body 12, shown in FIG. 1, is an input plunger 14 which is engaged at its upper end by an arm 16 of the balancing beam 18. Located in the upper end of the valve chamber, which is permanently connected to an exhaust or return port 20, is the exhaust valve assembly consisting of an inner spool 22 in abutment at its upper end with the lower end of the input plunger 14 and which is guided for axial movement within a sleeve-like exhaust valve body 24. The spool 22 has an axial bore 26 extending upwardly from its lower end face and terminating in radial passages 28 leading into an external annular groove 30 which in use cooperates with radial ports in the sleeve which are permanently connected to the exhaust port in the body. Disposed in the lower part of the valve chamber 10 is the inlet valve assembly 32 including a fixed sleeve or body 34 and, axially displaceable therein, an inlet spool 36 which at its upper end is rigidly attached to the exhaust valve body 24 by a tubular connecting piece 39, the inlet spool 36 being urged upwardly by a spring 38 located within a detachable end cap 40 closing the lower end of the valve chamber 10. A pump-connected pressure fluid supply port 42 in the lower part of the valve body 12 opens via a port 44 in the end cap into a first annular space 46 between the said cap 40 and the inlet body 34 while a brake-connected port 47 spaced upwardly from said supply port 42 opens into a second annular space 48 between the valve body 34 and a portion of the inlet valve sleeve of reduced diameter. The axial passage in the inlet spool 36 is coincident with a similar passage in the connector piece 39, which opens into the space beneath the exhaust spool 22, a lower set of radial passages 50 in the inlet spool 36 leading into an external annular groove 52 which cooperates with radial ports 54 in the inlet valve body connected with the first annular space 46 while an upwardly-spaced second set of radial passages 56 in said inlet spool and a connected external annular groove 58 cooperate via inclined passages 60 in the inlet valve body with the second annular space 48.

In operation with the brakes in a released condition, the two valve assemblies each occupy an uppermost position where the radial passages 28 in the exhaust spool 22 overlap the radial ports in the exhaust valve body 24 but the lower set of radial passages 50 in the inlet spool 36 are non-coincident with the radial ports 54 in the inlet valve body 34 so that the first annular space 46 connected to the supply port 42 is sealed off while the brake-connected port 47 is connected to the exhaust port 20 via the second annular space 48, the said inclined passages 60, the bores in the connector piece 39 and the exhaust spool 22 and the ports in the exhaust valve body leading into the upper end of the valve chamber 10. When the input plunger 14 is depressed by a thrust on the balancing beam 18 it first moves the exhaust spool 22 downwardly via a misalignment compensating needle 23 to interrupt the connection between the exhaust spool 22 and the exhaust sleeve or body 24 and the plunger 14 then engages the said sleeve and moves the entire exhaust assembly downwardly together with the inlet spool 36 rigidly connected thereto. By this movement the lower set of radial passages 50 in the inlet spool 36 are caused to overlap the radial ports in the inlet sleeve so that pressure fluid is now metered from the supply port via the first annular space 46 and said overlapping ports and passages to the interior of the inlet spool 36 and thence via the second set of radial passages 56, the inclined passages 60 and the second annular space 48 to the brake-connected port 47. This delivery pressure will also react on the lower end of the exhaust spool 22 to balance the applied thrust and thus the inlet valve assembly meters fluid to the brakes at a pressure determined by the thrust on the brake pedal.

Figure 2:
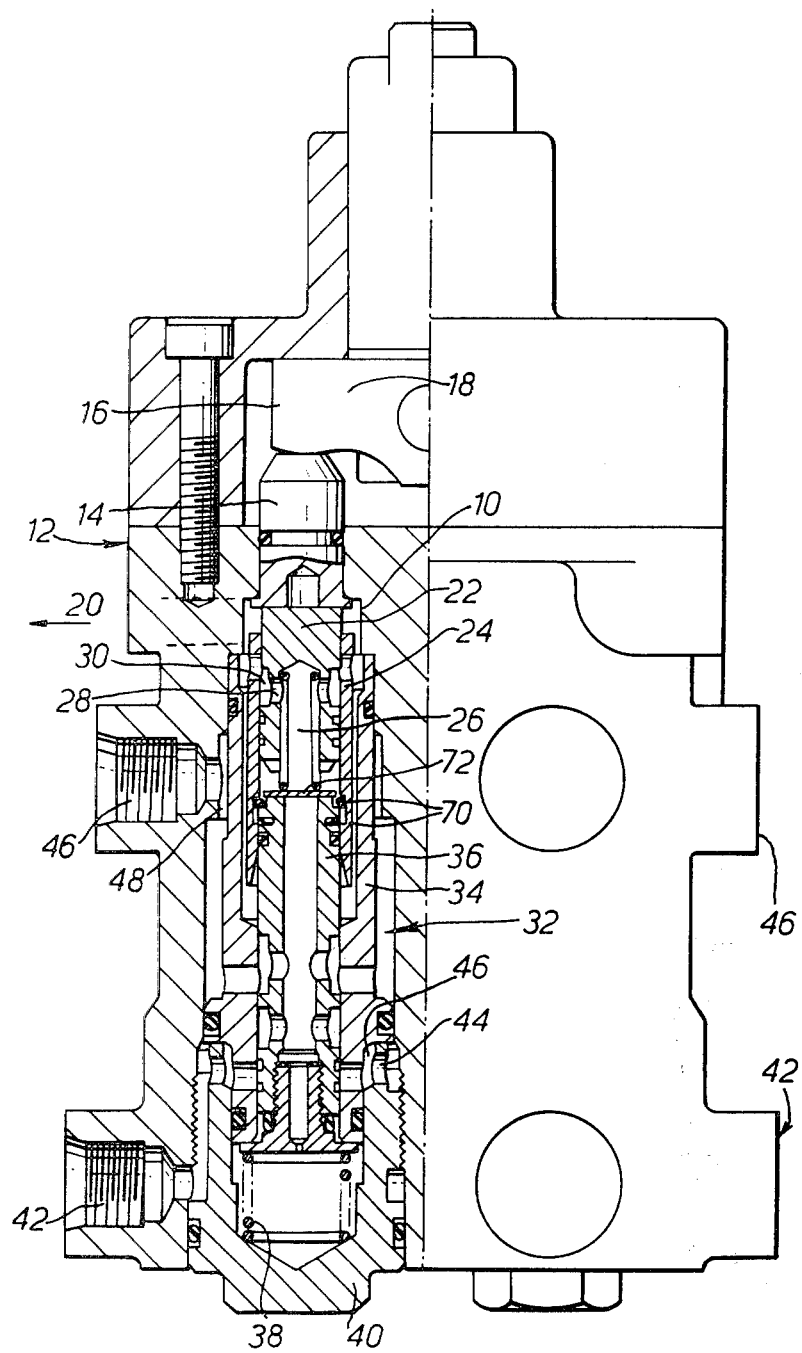

In a second, preferred, embodiment shown in FIG. 2, the inlet spool 36 is connected to the exhaust valve body 24 not by a connecting piece 39 but by two internal circlips 70. This connection allows a limited radial float and hence accurate alignment of the exhaust valve body 24 with the inlet plunger 14. The axial passage in the inlet spool 36 opens into the space beneath the exhaust spool 22, but with a non-return valve 72 acting on the top of the inlet spool 36 to prevent the downward flow of fluid from the exhaust spool 22. In use, once the connection between the exhaust spool 22 and the sleeve 24 is interrupted, the non-return valve closes and the downward movement of the plunger 14 is transmitted to the exhaust valve assembly by virtue of the hydraulic pressure into the said space. The non-return valve 72 serves to minimize the travel to the balanced position by automatically moving the inlet spool as soon as the exhaust port has been closed.

The construction of the two embodiments described above gives a finer control of the valve overlap when balanced, reduces valve leakage for a given valve overlap, permits ease of individual adjustment of inlet and exhaust valve overlap to maximize metering performance at a given permitted leakage and also eliminates the need for precise concentricity between inlet and exhaust valves.

It is also to be noted that in the improved construction exhaust valve overlap is self-adjusting for wear whilst damping of the inlet spool is also possible where required.

What we claim is:

1. An hydraulic brake valve for controlling the application and release of hydraulic fluid pressure to and from the brake units of a vehicle, comprising an exhaust valve assembly having an exhaust spool displaceable within an exhaust valve sleeve by a thrust from a brake operating-member to close off a brake-connected port from an exhaust port, and an inlet valve assembly having an inlet spool connected for axial displacement with the exhaust valve sleeve, the inlet spool being movable within the coacting with an inlet sleeve fixed with respect to the inlet spool by the subsequent displacement of the exhaust valve spool to meter pressure fluid from a supply port connected with an interior of the inlet sleeve to the brake-connected port.

2. A valve according to claim 1 wherein the inlet spool is attached to the exhaust valve sleeve for axial movement therewith.

3. A brake valve for controlling the application and release of fluid pressure to and from the brake units of a vehicle, comprising an exhaust valve assembly having an exhaust spool displaceable within an exhaust valve sleeve by a thrust from a brake operating-member to close off a brake-connected port from an exhaust port, and an inlet valve assembly having an inlet spool arranged concentrically within the exhaust valve sleeve and connected thereto for axial displacement with the exhaust valve sleeve by means permitting limited radial movement of the exhaust valve sleeve relative to the inlet spool for accurate alignment of the exhaust spool with the operating member therefor, said inlet spool being movable within a fixed inlet sleeve by the subsequent displacement of the exhaust valve assembly to meter pressure fluid from a supply port to the brake-connected port.

4. A valve according to any one of claims 1 to 3 further comprising a non-return valve arranged to prevent the flow of hydraulic fluid from the exhaust port to the inlet spool so that after closure of the exhaust port, further movement of the exhaust spool is transmitted to the inlet spool by the hydraulic fluid trapped between the non-return valve and the exhaust spool.

* * * * *